United States Patent
Kato (10) Patent No.: US 10,310,078 B2
(45) Date of Patent: Jun. 4, 2019

(54) NOTIFICATION DEVICE OF AN APPROACHING VEHICLE

(71) Applicant: TOYOTA JIDOSHA KABUSHIKI KAISHA, Toyota-shi, Aichi (JP)

(72) Inventor: Mitsuharu Kato, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 260 days.

(21) Appl. No.: 15/459,519

(22) Filed: Mar. 15, 2017

(65) Prior Publication Data

US 2017/0285164 A1 Oct. 5, 2017

(30) Foreign Application Priority Data

Apr. 1, 2016 (JP) ................. 2016-074640

(51) Int. Cl.
*G01S 7/00* (2006.01)
*G01S 13/46* (2006.01)
*G01S 13/86* (2006.01)
*G01S 13/93* (2006.01)

(52) U.S. Cl.
CPC ............ *G01S 13/931* (2013.01); *G01S 7/003* (2013.01); *G01S 13/46* (2013.01); *G01S 13/86* (2013.01); *G01S 2013/464* (2013.01); *G01S 2013/936* (2013.01); *G01S 2013/9339* (2013.01); *G01S 2013/9353* (2013.01); *G01S 2013/9357* (2013.01); *G01S 2013/9375* (2013.01)

(58) Field of Classification Search
CPC ........ G01S 13/931; G01S 7/003; G01S 13/46; G01S 2013/464; G01S 13/83; G01S 2013/9339; G01S 2013/9353; G01S 2013/9357; G01S 2013/936
See application file for complete search history.

(56) References Cited

U.S. PATENT DOCUMENTS

| 5,907,293 A * | 5/1999 | Tognazzini ........... B60W 40/04 340/436 |
| 6,445,308 B1 * | 9/2002 | Koike ................... G01S 5/0072 180/167 |
| 8,000,897 B2 * | 8/2011 | Breed .................. B60N 2/2863 701/301 |

(Continued)

FOREIGN PATENT DOCUMENTS

JP 2012-185084 A 9/2012

*Primary Examiner* — Peter M Bythrow
(74) *Attorney, Agent, or Firm* — Oliff PLC (57) ABSTRACT

A notification device of an approaching vehicle detects an approach of the other vehicle running a crossroad intersecting a run way of an own vehicle at an anterior intersection and an arrival direction thereof by a radar sensor and notifies a driver thereof. A reflection distance-acquisition part computes a reflection distance Xw according to a difference between absolute values of an X-axis component of a relative position acquired by the radar sensor and an X-axis component of a converted relative position acquired by a relative-position acquisition part of the other vehicle in an X-Y rectangular coordinates with its origin at a location and a Y-axis in a traveling direction of the own vehicle. A notification restriction part forbids a notification of the arrival direction of the other vehicle when the Xw has not fluctuated for a predetermined time or longer.

6 Claims, 8 Drawing Sheets

(56) References Cited

U.S. PATENT DOCUMENTS

| | | | |
|---|---|---|---|
| 8,340,894 B2* | 12/2012 | Yester | G08G 1/163 |
| | | | 340/436 |
| 8,618,952 B2* | 12/2013 | Mochizuki | G08G 1/161 |
| | | | 340/435 |
| 8,917,189 B2* | 12/2014 | Mukaiyama | G08G 1/09623 |
| | | | 340/905 |
| 2002/0036584 A1* | 3/2002 | Jocoy | G01S 13/931 |
| | | | 342/70 |
| 2007/0164896 A1* | 7/2007 | Suzuki | G01S 7/006 |
| | | | 342/70 |

* cited by examiner

NOTIFICATION DEVICE OF AN APPROACHING VEHICLE

TECHNICAL FIELD

The present invention relates to a notification device of an approaching vehicle, which notifies a driver that a vehicle, which is running a road (namely, crossroad) intersecting a run way of an own vehicle (self-vehicle) at an intersection, is approaching the own vehicle when the own vehicle is running just before the intersection.

BACKGROUND ART

One of conventionally known notification devices of an approaching vehicle (which may be referred to as a "conventional device" hereinafter) detects the other vehicle running a crossroad and approaching an own vehicle by a radar sensor.

Specifically, a conventional device transmits a radio wave which has a frequency applicable to a millimeter-wave band (which may be referred to as a "millimeter wave" hereinafter) by a radar sensor, and receives a reflected wave reflected by the other vehicle existing within a transmission range by the radar sensor. The radar sensor generates a signal which has a beat frequency obtained by signal processing of the transmitted wave and the received wave (which may be referred to as a "beat signal" hereinafter) and computes a distance between the radar sensor and the other vehicle in the direction while determining a direction, in which an output peek of the beat signal was detected, as a direction in which the other vehicle exists.

The conventional device acquires (determines) a location (relative position) of the other vehicle with respect to the own vehicle based on the "direction and distance" of the other vehicle thus acquired. The conventional device acquires the relative position of the other vehicle with a predetermined sampling period, and determines the direction of movement of the other vehicle based on the time shift of the position. And, when the conventional device judges that the other vehicle is approaching the own vehicle based on the direction of movement of the other vehicle, it notifies a driver of the own vehicle of that effect along with the direction in which the other vehicle exists. Thereby, the driver of the own vehicle can recognize the fact that the other vehicle is approaching the own vehicle and the direction in which the other vehicle is approaching the own vehicle (which may be referred to as an "arrival direction" hereinafter) (for example, refer to the Patent Document 1).

CITATION LIST

Patent Literature

[PTL1] Japanese Patent Application Laid-Open (kokai) No. 2012-185084

SUMMARY OF INVENTION

Figure 1A:
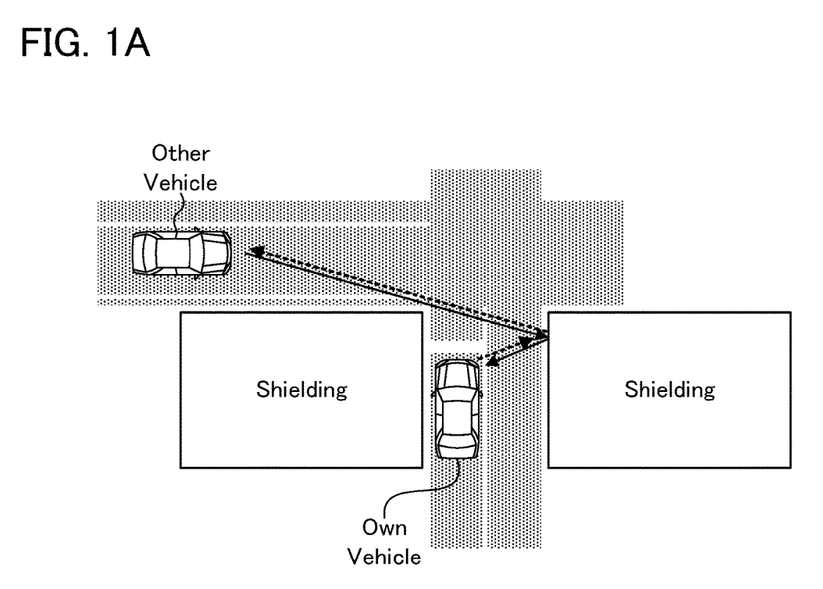
FIG. 1A is a schematic view for showing an example of a situation where a radar sensor falsely recognizes that the other vehicle is located on the right side of an own vehicle when a millimeter wave reflected by the other vehicle located on the left side as viewed from the own vehicle at an intersection is further reflected by shielding located on the right side of the own vehicle.
Figure 1B:
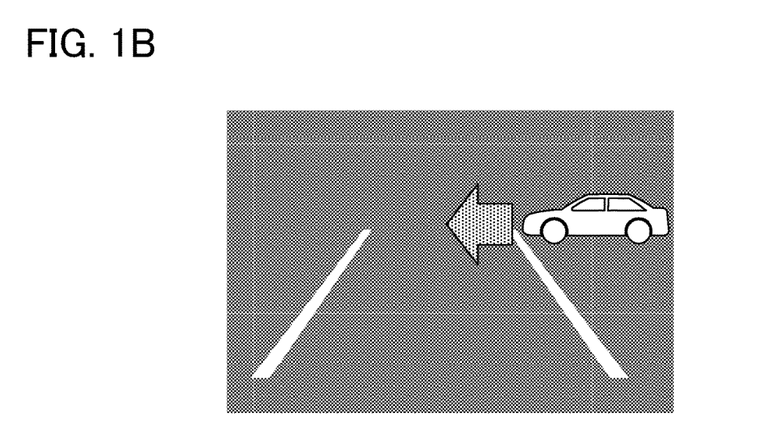
FIG. 1B is a false display (notification) based on the false recognition as shown in FIG. 1A.

By the way, at some intersections, as shown in FIG. 1A, a wall of shielding, such as a house, a building, and a fence, may exist along a run way of an own vehicle, and a millimeter wave may be reflected by those walls as shown with arrows and become a reflected wave which is referred to as a "ghost wave." In this case, the conventional device recognizes that the other vehicle exists in a different location from a location where the other vehicle actually exists. As a result, for example, the conventional device may perform a false display (notification) showing that the other vehicle is approaching from a different direction from a direction in which the other vehicle is actually approaching, as shown in FIG. 1B.

The present invention has been conceived in order to cope with the above-mentioned problem. Namely, one of the objectives of the present invention is to provide a notification device of an approaching vehicle, which can reduce a possibility of notifying a driver of an arrival direction of the vehicle falsely recognized due to a ghost wave.

A notification device of an approaching vehicle according to the present invention (which may be referred to as the "present invention device" hereinafter), comprising:

a radar sensor (millimeter-wave radar sensor 33) configured to transmit a radio wave and received a reflected wave of said transmitted radio wave, and to acquire, as radar sensor information, information required for determining a location of the other vehicle with respect to an own vehicle based on said transmitted radio wave and said reflected and received wave which was received, a notification unit (40) (a display 41 and a speaker 42) configured to notify a driver of said own vehicle of information for drive assist, and a control unit (20) including a notification control part (26, step 580) configured to make said notification unit (40) give notice of first information showing that the other vehicle is approaching and second information showing an arrival direction of said approaching other vehicle, when it is judged that there is the other vehicle approaching said own vehicle while running a crossroad which intersects an anterior run way of said own vehicle, based on a time shift of said radar sensor information.

As mentioned above, radar sensor information may be information of an existent vehicle, or it may be information of non-existent vehicle (ghost vehicle) due to a ghost wave. In the latter case, there is a possibility that false information may be given to a driver when notice of the second information that shows the arrival direction of an approaching other vehicle is given to the driver.

Therefore, said control unit comprises, an other vehicle information-acquisition part (31, 21, step 525) configured to acquire other vehicle information for determining a location of said other vehicle using at least one of vehicle-to-vehicle communication and road-to-vehicle communication, an own vehicle information-acquisition part (32, 22, step 505) configured to acquire own vehicle information for determining a location of said own vehicle based on a signal given from the outside of said own vehicle, a relative position-acquisition part (24, step 545) configured to acquire a relative position of said other vehicle with respect to said own vehicle by calculation based on said other vehicle information and said own vehicle information, a reflection distance-acquisition part (25, step 550) configured to compute a value (($|Xr|-|Xc|$)/2) according to a difference between an absolute value of a first component ($Xr$) and an absolute value of a second component ($Xc$), as a reflection distance-correlation value ($Xw$), based on said radar sensor information and said relative position acquired by said relative-position acquisition part (24), said first component $Xr$ is an X-axis component of a relative position of said other vehicle with respect to said own vehicle, which is determined based on said radar sensor information, in an X-Y coordinate space with its origin set at a location of said own vehicle, a Y-axis set in a traveling direction of said own vehicle and an X-axis set in a direction perpendicular to the Y-axis, and said second component Xc is an X-axis component of a converted relative position that is a location of said relative position acquired by said relative-position acquisition part in said coordinate space, and a notification restriction part (27, step 575, step 560, step 565, step 585) configured to forbid said notification unit (40) to give notice of said second information when it can be considered that said reflection distance-correlation value has not fluctuated for a predetermined time period or longer.

In accordance with the present invention device, a value according to a difference between an absolute value of an X-axis component of a relative position of said other vehicle with respect to said own vehicle, which is determined based on said radar sensor information, in said coordinate space (first component) and an absolute value of an X-axis component of a converted relative position that is a location of said relative position acquired by said relative-position acquisition part (24) in said coordinate space (second component) is computed as a reflection distance-correlation value. This reflection distance-correlation value should become an approximately constant value when a wall of shielding which reflects the reflected wave of the radar sensor exists. In other words, when the wall of shielding which reflects the reflected wave of the radar sensor does not exist, the reflection distance-correlation value fluctuates (varies).

Based on such knowledge, since it can judge that the wall of shielding which reflects the reflected wave of the radar sensor exists when it can be considered that the reflection distance-correlation value has not fluctuated for a predetermined time period or longer, the present invention device forbids the notification unit to give notice of the second information (information showing an arrival direction of the other vehicle). As a result, a possibility of notifying a driver of the arrival direction of the other vehicle recognized falsely due to a ghost wave can be reduced.

Said notification restriction part (27) may be configured to consider that said reflection distance-correlation value has not fluctuated for said predetermined time period or longer when a specific condition in which a state that an absolute value of a difference between said reflection distance-correlation value at present and said reflection distance-correlation value said predetermined time period ago is less than a predetermined threshold value has continued for said predetermined time period or longer is satisfied (step 575, step 560, step 565, step 585). Thereby, the notification restriction part can certainly judge whether the reflection distance-correlation value has not fluctuated for the predetermined time period or longer. In the following explanations, the above-mentioned "absolute value of the difference between the reflection distance-correlation value at present and the reflection distance-correlation value the predetermined time period ago" may be referred to as a "fluctuation range of a reflection distance-correlation value" or a "fluctuation range" simply.

By the way, even though no wall of shielding which reflects the reflected wave of the radar sensor does exists, there may be a case where the relative position determined based on the radar sensor information and the relative position acquired by the relative-position acquisition part (24) are not coincident with each other for the same other vehicle and a reflection distance-correlation value is computed as a minute value which is not 0 (zero), due to a detection error, a calculation error, etc., for example. Since a fluctuation range of the reflection distance-correlation value thus computed due to an error is small, there is a possibility that the notification restriction part (27) may consider that the reflection distance-correlation value has not fluctuated for the predetermined period or longer and forbid the notification unit (40) to give notice of the second information. However, the above-mentioned other vehicle is not a ghost vehicle, but an existent vehicle, and the notification restriction part (27) should normally make the notification unit (40) give notice of not only the first information, but also the second information (the notification of the second information from the notification unit (40) should not be forbidden).

Then, said notification restriction part (27) may be configured not to forbid said notification unit (40) to give notice of said second information even when it can be considered that said reflection distance-correlation value has not fluctuated for said predetermined time period or longer, in a case where both said first component and said second component are positive values or a case where both said first component and said second component are negative values (step 800, step 580). In other words, the notification restriction part (27) may be configured not to forbid the notification unit (40) to give notice of the second information even when it can be considered that the reflection distance-correlation value has not fluctuated for the predetermined time period or longer, in a case where both the relative position determined based on the radar sensor information and the relative position acquired by the relative-position acquisition part (24) are on the same side of the own vehicle (both of them are on the right side of the own vehicle or on the left side of the own vehicle).

In accordance with this, a "situation where the notification of the second information whose notice should be normally given is forbidden" due to a detection error and/or a calculation error, etc., for example, can be avoided. As a result, drop in frequency that notice of an arrival direction of the other vehicle is correctly given to the driver is decreased, and this leads to traffic safety.

Said reflection distance acquisition part (25) may be configured to compute a value of a half of the difference between the absolute value of said first component and the absolute value of said second component as a reflection distance as said reflection distance-correlation value (step 550). More specifically, said reflection distance acquisition part (25) may configured to compute said reflection distance Xw based on the following formula (6) in a case where a relative distance Lr from said own vehicle to said other vehicle is included in said radar sensor information and said converted relative position is expressed as (Xc, Yc) (step 550).

$$Xw = \frac{\sqrt{Lr^2 - Yc^2} - |Xc|}{2}$$

In the above-mentioned explanation, in order to help for understanding the present invention, to a configuration of the present invention corresponding to an embodiment, which will be mentioned later, the same name and/or reference sign used in the embodiment is added in parenthesis. However, respective constituents of the present invention are not limited to the embodiment specified with the above-mentioned name and/or the above-mentioned reference signs. The objectives, other features and accompanying advantages of the present invention will be easily understood from the following explanation about the embodiments of the present invention described referring to drawings.

DESCRIPTION OF EMBODIMENTS

Hereafter, notification devices of an approaching vehicle (crossing collision alert device) according to various embodiments of the present invention will be explained referring to drawings. Each notification device of an approaching vehicle is applied to a vehicle. In the present specification, when a vehicle, on which the notification device of an approaching vehicle is mounted, needs to be distinguished from other vehicles, the vehicle, on which the notification device of an approaching vehicle is mounted, is referred to as an "own vehicle."

First Embodiment (Configuration)

Figure 2:
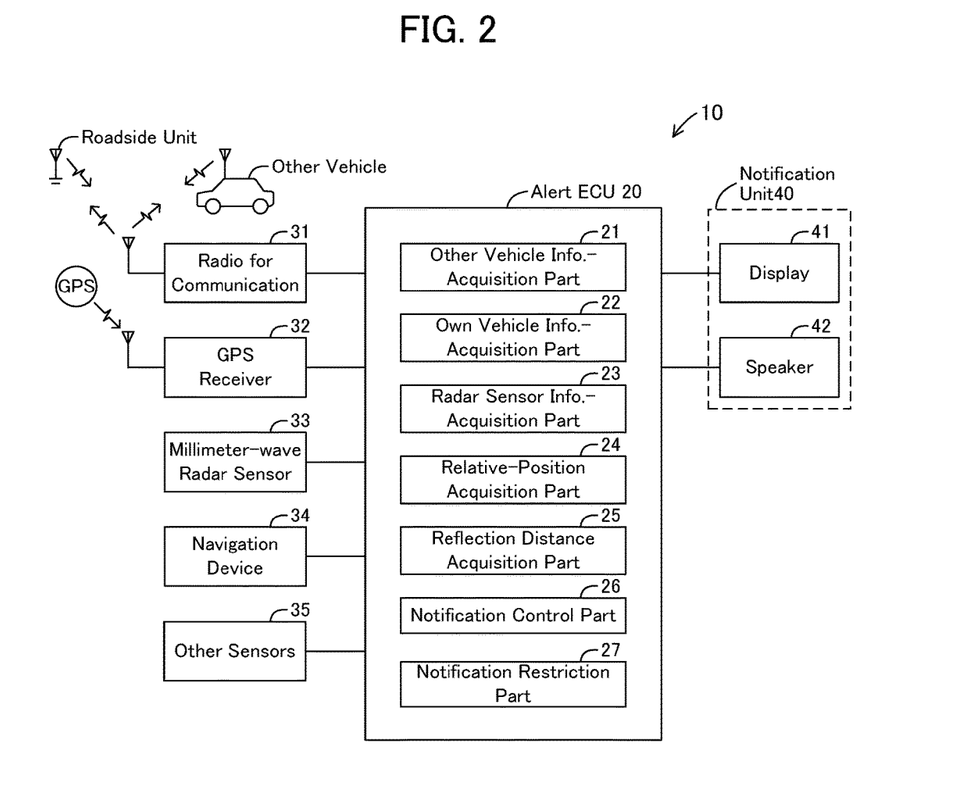
FIG. 2 is a schematic block diagram for showing a configuration of a notification device of an approaching vehicle according to a first embodiment of the present invention (first device).

As shown in FIG. 2, A notification device of an approaching vehicle (which may be referred to as a "first device") 10 according to a first embodiment of the present invention comprises an alert ECU 20, a radio for communication 31, a GPS receiver 32, a millimeter-wave radar sensor 33, a navigation device 34, one or a plurality of vehicle sensor 35 and a notification unit 40. The notification unit 40 comprises a display 41 and a speaker 42.

The alert ECU 20 is an electric control device (ECU) which has a microcomputer as its principal part. The microcomputer of the alert ECU 20 includes a storage unit, such as a CPU, ROM and RAM, and an interface. The CPU realizes various functions by performing an instruction (program) stored in the ROM.

The alert ECU 20 is connected with the radio for communication 31, the GPS receiver 32, the millimeter-wave radar sensor 33, the navigation device 34, the other vehicle sensors 35, the display 41, and the speaker 42.

The radio for communication 31 is a device for communication with a vehicle having a vehicle-to-vehicle communication function around an own vehicle and a roadside unit having a road-to-vehicle communication function around the own vehicle, and comprises a communication antenna and a communication-processing unit.

The radio for communication 31 transmits a vehicle-to-vehicle communication signal from the own vehicle to the other vehicle existing within a range in which a vehicle-to-vehicle communication is possible, and also receives a vehicle-to-vehicle communication signal from the other vehicle existing within a range in which a vehicle-to-vehicle communication is possible, through the communication antenna. When a vehicle-to-vehicle communication signal is received from the other vehicle, the radio for communication 31 demodulates the vehicle-to-vehicle communication signal to extract information from the other vehicle, and supplies the information to the alert ECU 20. The radio for communication 31 modulates information of the own vehicle supplied from the alert ECU 20, and transmits the modulated signal to the other vehicle from the communication antenna.

Furthermore, the radio for communication 31 transmits a road-to-vehicle communication signal to a roadside unit existing within a range in which a road-to-vehicle communication is possible, and also receives a road-to-vehicle communication signal from a roadside unit existing within a range in which a road-to-vehicle communication is possible. When a road-to-vehicle communication signal is received from a roadside unit, the radio for communication 31 demodulates the road-to-vehicle communication signal to extract information from the roadside unit, and supplies the information to the alert ECU 20. The radio for communication 31 modulates information of the own vehicle supplied from the alert ECU 20, and transmits the modulated signal to the roadside unit from the communication antenna.

The GPS receiver 32 is a device for detecting an absolute position of an own vehicle, and comprises a GPS antenna and a communication-processing unit. GPS is an abbreviation for Global Positioning System. The GPS receiver 32 receives a GPS signal from a GPS satellite using a GPS antenna. The GPS receiver 32 demodulates the received GPS signal, and transmits the information of the demodulated GPS signal to the alert ECU 20.

The millimeter-wave radar sensor 33 transmits a millimeter wave to a range including a front and diagonal fronts of a vehicle. When an object (for example, the other vehicle) which reflects the millimeter wave within a transmission range of the millimeter wave exists, the millimeter wave is reflected and turns into a reflected wave. The millimeter-wave radar sensor 33 receives the reflected wave. The millimeter-wave radar sensor 33 generates a beat signal obtained by signal processing of the transmitted wave and the received wave whenever a constant time period ts has passed, and determines a direction in which an output peek of the beat signal is detected as an direction (orientation) in which the object exists. Furthermore, the millimeter-wave radar sensor 33 detects a distance (relative distance) Lr between the object whose direction was determined and the own vehicle, and a traversal distance |Xr| of the object whose direction was determined on the basis of the own vehicle, whenever the constant time period ts has passed. These determined direction, relative distance Lr and traversal distance |Xr| of the object may be referred to as "radar sensor information."

In addition, the traversal distance |Xr| is an absolute value of an X coordinate of the object location in an X-Y coordinate space with its origin set at a location of the own vehicle (a central part of a front end of the own vehicle), a Y-axis set in a traveling direction of the own vehicle and an X-axis set in a direction perpendicular to the Y-axis. The Y-axis is defined so as to have a positive value for a forward direction of the own vehicle, and the X-axis is defined so as to have a positive value for a right direction of the own vehicle. Therefore, the relative position of the other vehicle with respective to the own vehicle, which is determined based on the radar sensor information, can be expressed as (Xr, Yr). The Xr which is an X-axis component of this "relative position" corresponds to the first component.

The navigation device 34 comprises a data base in which map information etc. is memorized, a touch panel which is a human machine interface for performing routing assistance etc., and a data processor which performs various kinds of calculation processing based on information memorized in the data base. Furthermore, the navigation device 34 extracts necessary information, such as map information etc., from the data base, and supplies it to the alert ECU 20. Road information (including intersection information) is included in the map information memorized in the data base.

The other sensors 35 include a vehicle speed sensor which detects velocity of the own vehicle (own vehicle speed).

The display 41 is a head-up display (which will be referred to as an HUD hereinafter). The HUD receives display information from various ECUs and the navigation device 34 in the own vehicle, and projects the display information on a partial region (display area) of a windshield of the own vehicle. As will be mentioned later, when the HUD receives a command signal for displaying a "notification image of an approaching vehicle (other vehicle approaching alert image) which is one of presentation images for an alert" from the alert ECU 20, the HUD displays the notification image of an approaching vehicle in accordance with the command signal. The displays 41 is not limited to an HUD, and it may be a meter display and/or a touch panel of the navigation device 34, etc., which are not shown.

When the speaker 42 a command signal for pronouncing a notification sound of an approaching vehicle supplied from the alert ECU 20, the speaker 42 sounds in accordance with the command signal. The speaker 42 may be a buzzer.

Focusing on functions realized with a microcomputer, the alert ECU 20 comprises an other vehicle information-acquisition parts 21, an own vehicle information-acquisition part 22, a radar sensor information-acquisition part 23, a relative-position acquisition part 24, a reflection distance acquisition part 25, a notification control part 26 and a notification restriction part 27.

Based on "information acquired through a vehicle-to-vehicle communication or road-to-vehicle communication" transmitted from the radio for communication 31, the other vehicle information-acquisition parts 21 acquires and updates an absolute position (Io, Ko) of the other vehicle existing around the own vehicle whenever the constant time period ts has passed. The absolute position is identified with a latitude Io and a longitude Ko.

The own vehicle information-acquisition part 22 acquires and updates the absolute position (Is, Ks) of the own vehicle based on the information of the demodulated GPS signal, whenever the constant time period ts has passed. The absolute position of the own vehicle is identified with a latitude Is and a longitude Ks.

The radar sensor information-acquisition part 23 acquires and updates the "relative distance Lr from the other vehicle and traversal distance |Xr| of the other vehicle" detected by the millimeter-wave radar sensor 33, whenever the constant time period ts has passed.

The relative-position acquisition part 24 obtains a relative position (I, K) of the other vehicle with respective to the own vehicle, which is expressed by "a latitudinal difference and a longitudinal difference", from the absolute position (Io, Ko) of the other vehicle and the absolute position (Is, Ks) of the own vehicle, in accordance with the following formula (1).

$$(I,K)=(Io-Is, Ko-Ks) \tag{1}$$

Furthermore, the relative-position acquisition part 24 acquires a traveling direction of the own vehicle (namely, the above-mentioned forward direction of the Y-axis) from a difference between an absolute position (Is (t−ts), Ks (t−ts)) of the own vehicle the constant time period ts ago and an absolute position (Is (t), Ks (t)) of the own vehicle at present. Then, the relative-position acquisition part 24 acquires a "relative position (Xc, Yc) in the X-Y coordinate space" of the other vehicle with respect to the own vehicle by carrying out coordinate conversion of the relative position (I, K) obtained by using the above-mentioned formula (1) to the place onto the above-mentioned X-Y coordinate space. This "relative position (Xc, Yc) in the X-Y coordinate space" corresponds to the "converted relative position" of the other vehicle with respect to the own vehicle, and the Xc which is an X-axis component of this "converted relative position" corresponds to the second component.

By the way, at some intersections, as shown in FIG. 1A, walls of shielding (reflection objects of a millimeter wave) exist along a run way of the own vehicle. In this case, a millimeter wave transmitted from the millimeter-wave radar sensor 33 was reflected by those walls to reach the other vehicle, and the millimeter wave reflected by the other vehicle is again reflected by the walls of shielding, and thereby it becomes a "ghost wave" and reach the millimeter-wave radar sensor 33.

Figure 3:
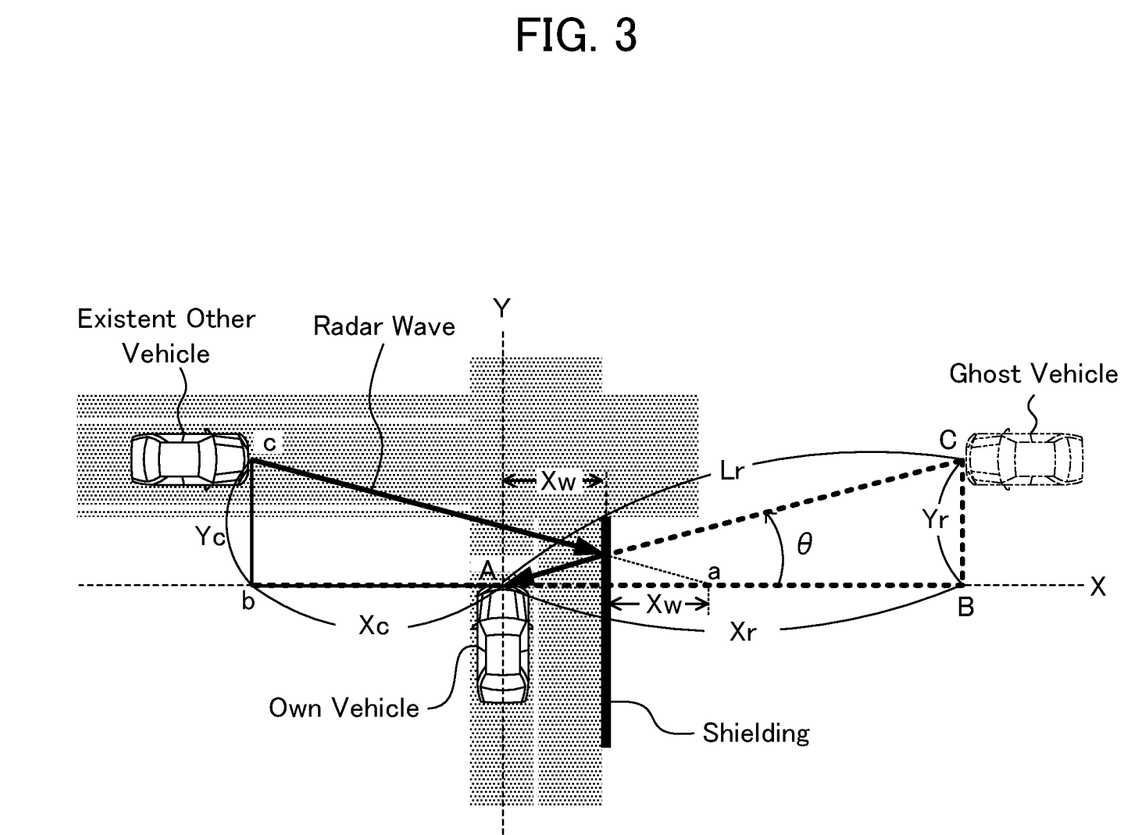
FIG. 3 is a schematic view for showing a situation where the other vehicle is approaching from the left side of an own vehicle at an intersection located ahead of the own vehicle, wherein shielding which reflects a reflected wave of a radar sensor exists on the right side of the own vehicle, the other vehicle is running a crossroad of the intersection.

In this case, as shown in FIG. 3, the alert ECU 20 recognizes as if the other vehicle (namely, ghost vehicle) existed in a location where it does not exist actually. Then, the alert ECU 20 judges whether a ghost vehicle is recognized, based on a reflection distance Xw which will be described below.

First, the reflection distance acquisition part 25 computes and acquires the "reflection distance Xw as a reflection distance-correlation value." More specifically, as shown in FIG. 3, a situation where the other vehicle is running a road (crossroad) which intersects a run way of an own vehicle at an intersection located ahead of the own vehicle and the other vehicle is approaching from a left side of the own vehicle is assumed. However, it is assumed that a wall of shielding which reflects a reflected wave of a radar sensor exists in a right side of the own vehicle. The reflection distance Xw is a distance from the own vehicle (radar sensor 33) to the wall of shielding (reflection object) beside the own vehicle.

In this situation, the millimeter-wave radar sensor 33 falsely recognizes as if the other vehicle existed in a direction at an angle of θ in a counterclockwise fashion from the forward direction of the X-axis forward at the counterclockwise rotation. In other words, what is called a "ghost vehicle" is detected at a location expressed by a coordinate (Xr, Yr).

In this case, as apparent from FIG. 3, a relation expressed by the following formula (2) is satisfied. When an angle in a counterclockwise fashion from the X-axis, at which the other vehicle (including the ghost vehicle) exists, is defined as an orientation θ which shows a direction in which the other vehicle exists, Xr=Lr×cos θ and Yr=Lr×sin θ.

$$Lr = \sqrt{Xr^2 + Yr^2} \qquad (2)$$

On the other hand, the converted relative position (Xc, Yc) and the relative position (Xr, Yr) exist at symmetrical positions with respect to the "wall of shielding existing on the right side of the own vehicle at a distance of the reflection distance Xw from the own vehicle." In other words, a triangle ABC shown in FIG. 3 is a triangle which is obtained by moving a triangle abc shown in FIG. 3 linearly symmetrically with respective to the wall of shielding. Therefore, the following formula (3) and formula (4) are satisfied.

$$|Xr| = |Xc| + 2 \times Xw \qquad (3)$$

$$Yr = Yc \qquad (4)$$

The following formula (5) is derived by substituting the formula (3) and the formula (4) into the formula (2) and squaring both sides thereof. From the formula (3), the reflection distance Xw which is one of the reflection distance-correlation values is defined as a value according to a difference ($=|Xc|-|Xc|$) between an absolute value of an X-axis component of the relative position of the other vehicle with respect to the own vehicle, which is determined based on the radar sensor information, in the above-mentioned X-Y coordinate space (|Xr|) and an absolute value of an X-axis component of the converted relative position acquired by the relative-position acquisition part 24 (|Xc|). The reflection distance-correlation value is not particularly limited as long as it is a value which has a correlation so that it becomes larger or smaller as the reflection distance Xw becomes larger.

$$Lr^2 = (|Xc| + 2 \times Xw)^2 + Yc^2 \qquad (5)$$

Since the reflection distance Xw is a positive value (Xw>0), the reflection distance Xw is expressed by the following formula (6), based on the formula (5). Therefore, the reflection distance acquisition part 25 computes the reflection distance Xw in accordance with the following formula (6). Thus, the reflection distance Xw can be obtained based on the relative distance (Lr) and the converted relative position (Xc, Yc).

$$Xw = \frac{\sqrt{Lr^2 - Yc^2} - |Xc|}{2} \qquad (6)$$

The notification control part 26 judges whether the own vehicle has advanced into an "area where an intersection exists ahead within a predetermined set distance from the own vehicle (notification area of an approaching vehicle)" based on the map information acquired from the navigation device 34 and the absolute position (Is, Ks) of the own vehicle acquired by the own vehicle information-acquisition part 22. Furthermore, when it is judged that the own vehicle has advanced into the notification area of an approaching vehicle, the notification control part 26 computes predicted time period TTC ($=|Xr|/|Vr|$) required for the other vehicle to reach the intersection, based on the distance (traversal distance |Xr|) and speed (transversal velocity Vr) of the other vehicle in the X-axis direction. The notification control part 26 computes the transversal velocity Vr from the amount of change per unit time in the traversal distance |Xr|. However, when the transversal velocity Vr can be obtained from the information acquired by a vehicle-to-vehicle communication or a road-to-vehicle communication, the notification control part 26 may use the transversal velocity Vr for calculation of the predicted time period TTC.

Furthermore, when the predicted time period TTC is a threshold time period TTCth or less, the notification control part 26 transmits a command signal to the display 41 so that a notification image of an approaching vehicle for showing that the other vehicle is approaching the own vehicle is displayed on the display 41. This notification image of an approaching vehicle is an image including a "first information showing that the other vehicle is approaching" and a "second information showing an arrival direction of the approaching other vehicle", and is an image shown in FIG. 1B, for example. In the image shown in FIG. 1B, an arrow indicates an arrival direction of the other vehicle.

However, as mentioned above, when the second information (information of an arrival direction of the other vehicle) is included in the notification image of an approaching vehicle based on the radar sensor information, there is a possibility that an arrival direction may be falsely displayed when the radar sensor information is information of a ghost vehicle, as shown in FIG. 1A and FIG. 1B. Namely, for example, there is a possibility that notice of false information showing that the other vehicle is approaching from a right side even though the other vehicle is approaching from a left side in fact or false information showing that the other vehicle is approaching from a left side even though the other vehicle is approaching from a right side in fact may be given to a driver of the own vehicle.

Then, the notification restriction part 27 judges whether the radar sensor information is "information of an existent vehicle" or "information of a ghost vehicle" using the reflection distance Xw as a reflection distance-correlation value acquired by the reflection distance acquisition part 25.

This judging method will be specifically mentioned below. As mentioned above, the reflection distance Xw is a distance between a wall of shielding (reflection object), which exists beside the own vehicle and reflects the reflected wave of the radar sensor, and the own vehicle. Therefore, when this reflection distance Xw remains approximately constant for a predetermined time period, there is a high possibility that a wall of shielding, such as a house, a roadside wall and a building, exists on a side of the own vehicle along a running direction of the own vehicle and the radar sensor information is information of a ghost vehicle due to a millimeter wave (ghost wave) reflected by this wall, for example.

Figure 4A:
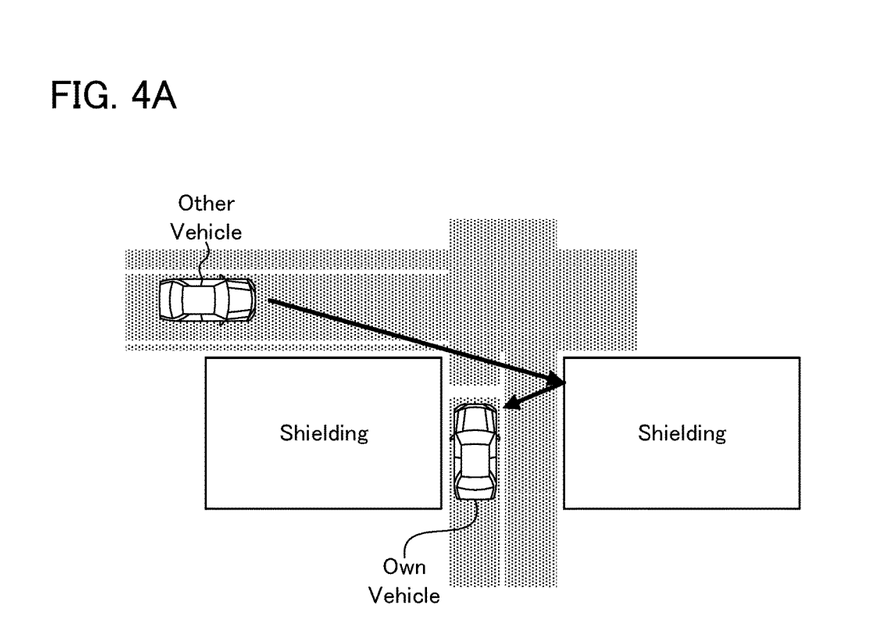
FIG. 4A is a schematic view for showing a situation where a radar sensor falsely recognizes that the other vehicle is located in the right side of an own vehicle when a millimeter wave reflected by the other vehicle located on the left side as viewed from the own vehicle is further reflected by the vehicle is further reflected by shielding located on the right side of the own vehicle at an intersection.
Figure 4B:
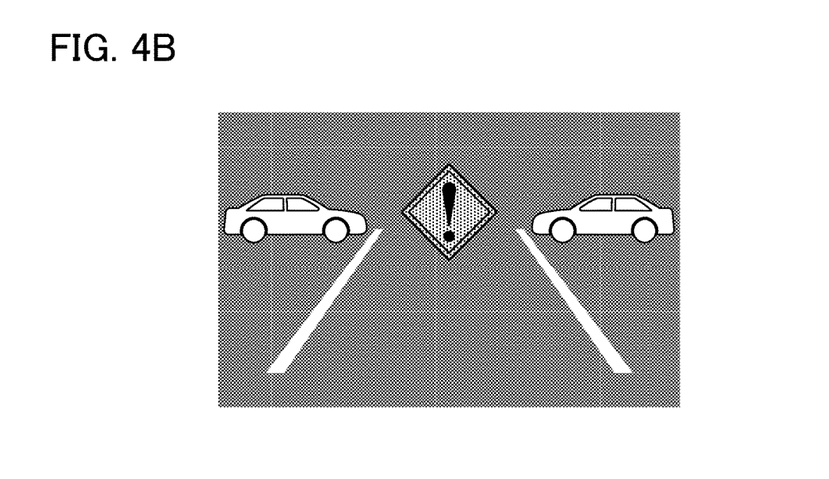
FIG. 4B is an example of an alarm display notified by the first device when a probability that the false recognition has occurred is high as shown in FIG. 4A.

From such a viewpoint, the notification restriction part 27 judges whether the reflection distance Xw remains approximately constant for a predetermined time period, and judges that the radar sensor information is information of a ghost vehicle when it is judged that the reflection distance Xw remains approximately constant for the predetermined time period. Then, in a case where it is judged that the radar sensor information is information of a ghost vehicle, the notification restriction part 27 displays the first information showing that the other vehicle is approaching, but forbids to display the second information showing an arrival directions of the approaching other vehicle, when displaying on the display 41 the notification image of an approaching vehicle, which shows that the other vehicle is approaching the own vehicle. As a result, for example, in a situation shown in FIG. 4A, a notification image of an approaching vehicle shown in FIG. 4B is displayed on the display 41.

(Specific Operation)

Next, specific operation of the first device 10 will be explained. Functions of respective parts of the alert ECU 20 are realized by a CPU of the alert ECU 20 performing a routine showed by a flowchart in FIG. 5 whenever a constant time period is has passed.

Figure 5:
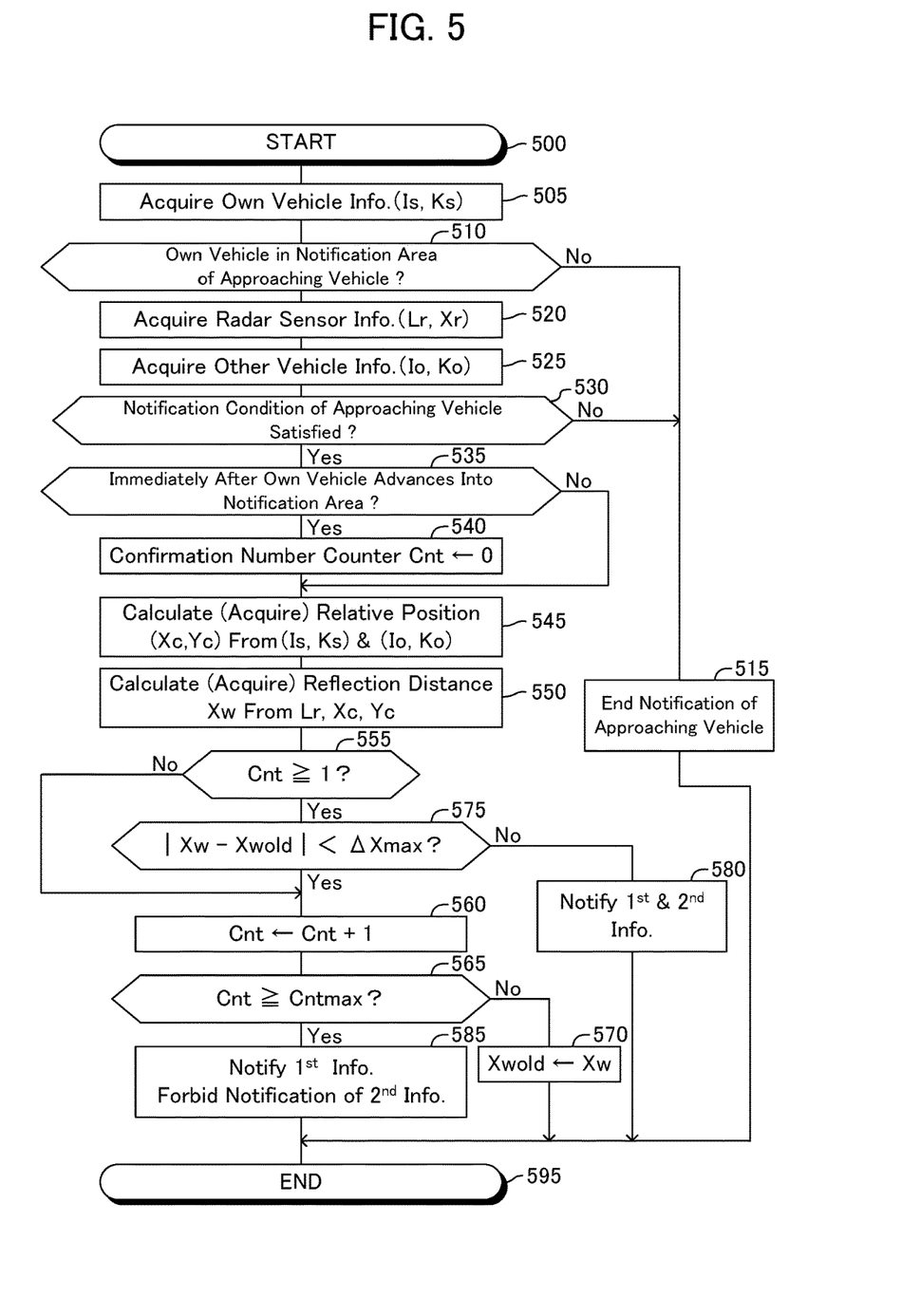
FIG. 5 is a flowchart for showing a specific operation of the first device.

When it becomes a predetermined timing, the CPU starts processing from step 500 of FIG. 5 and progresses to step 505, and acquires the absolute position (Is, Ks) of the own vehicle as the own vehicle information from the GPS receiver 32. Next, the CPU progresses to step 510, and judges whether the own vehicle exists in the notification area of an approaching vehicle, based on the map information acquired from the navigation device 34 and the absolute position (Is, Ks) of the own vehicle.

When the own vehicle does not exist in the notification area of an approaching vehicle, the CPU judges as "No" at step 510 and progresses to step 515, and ends a display of the notification image of an approaching vehicle. Actually, the display of the notification image of an approaching vehicle is not being performed at this time point. Therefore, the CPU performs the processing of step 515 in confirmation. Thereafter, the CPU progresses to step 595, and once ends this routine.

On the other hand, when the own vehicle exists in the notification area of an approaching vehicle, the CPU judges as "Yes" at step 510, performs in order processing of step 520 and step 525 which will be described below, and progresses to step 530 thereafter.

Step 520: the CPU acquires the radar sensor information (the relative distance Lr, the traversal distance |Xr|) from the millimeter-wave radar sensor 33.

Step 525: the CPU acquires the absolute position (Io, Ko) of the other vehicle which exists around the own vehicle as other vehicle information, based on the "information acquired through vehicle-to-vehicle communication or road-to-vehicle communication" transmitted from the radio for communication 31.

When the CPU progresses to step 530, the CPU judges whether a notification condition of an approaching vehicle is satisfied. More specifically, the CPU judges whether the vehicle, for which the above-mentioned predicted time period TTC is the threshold time TTCth or less, is included in the radar sensor information. When the notification condition of an approaching vehicle is not satisfied, the CPU judges as "No" at step 530a and progresses to step 515, and once ends this routine thereafter.

On the other hand, when the notification condition of an approaching vehicle is satisfied, the CPU judges as "Yes" at step 530 and progresses to step 535, and judges whether it is immediately after the own vehicle advances into the notification area of an approaching vehicle, based on the map information acquired from the navigation device 34 and the absolute position (Is, Ks) of the own vehicle.

When it is immediately after the own vehicle advances into the notification area of an approaching vehicle, the CPU judges as "Yes" at step 535 and progress to step 540, and initialize a confirmation number counter Cnt by setting it to zero (zero). The confirmation number counter is a counter which shows number of times of performing processing in which the reflection distance Xw is computed after the own vehicle advances into the notification area of an approaching vehicle. Next, the CPU performs in order processing of step 545 and step 550, which will be described below, and progresses to step 555.

Step 545: the CPU calculates and acquires the converted relative position (Xc, Yc) of the other vehicle with respective to the own vehicle from the absolute position (Io, Ko) of the other vehicle and the absolute position (Is, Ks) of the own vehicle, as mentioned above.

Step 550: the CPU calculates and acquires the reflection distance Xw based on the relative distance (Lr) and the relative position (Xc, Yc), as mentioned above.

Next, the CPU progresses to step 555, and judges whether the confirmation number counter Cnt is "1" or more. When the confirmation number counter Cnt is less than "1", i.e., when it is 0 (zero), the reflection distance Xw is computed only once after the own vehicle advances into the notification area of an approaching vehicle. Therefore, the following step 575, in which the magnitude of a fluctuation range of the reflection distance Xw is evaluated, cannot be performed. Therefore, when the confirmation number counter Cnt is less than "1", the CPU judges as "No" at step 555 and progresses directly to step 560, and increases a value of the confirmation number counter Cnt by only "1."

Next, the CPU progresses to step 565, and judges whether the confirmation number counter Cnt is a predetermined upper limit number (threshold) Cntmax. This upper limit number (threshold) Cntmax is set to a predetermined value of two or more (in this example, "10"). When it is immediately after performing the processing of the previous step 540, the value of the confirmation number counter Cnt is "1" by processing of step 560. Therefore, the CPU judges as "No" at step 565 and progresses to step 570, and memorizes the reflective distance Xw (computed at step 550 this time) at that time point as a last reflection distance (Xwold). Thereafter, the CPU progresses to step 595, and once ends this routine.

When this state continues, the CPU starts the processing again from step 500 after the constant time period ts, and thereafter performs processing of step 505, step 510, step 520 to step 530, and judges as "No" at step 535 and progresses to step 545 directly. Then, the CPU performs processing of step 545 and step 550, and progresses to step 555. At this stage, since the confirmation number counter Cnt is "1", the reflection distance Xw computed in the past is memorized as Xwold. Therefore, the magnitude of the fluctuation range of the reflection distance Xw can be evaluated.

Therefore, the CPU judges as "Yes" at step 555 and progress to step 575, and judges whether an absolute value of a difference between the reflection distance Xw computed this time and the reflection distance Xwold computed last time (namely, magnitude ΔXw of the fluctuation range of the reflection distance Xw during the constant time period ts) is less than a predetermined upper limit value (threshold ΔXmax).

When the magnitude ΔXw of the fluctuation range is the upper limit value ΔXmax or more, it means that the fluctuation of the reflection distance Xw is large, and this means that a "reflection object (wall of shielding) of the reflected wave of the radar sensor" located continuously at a constant distance beside the own vehicle does not exist. Namely, in this case, the radar sensor information is information of an existent vehicle (vehicle that exists actually) and there is a high possibility that it is not information of a ghost vehicle. Therefore, in this case, the CPU judges as "No" at step 575 and progresses to step 580, and displays on the display 41 a notification image of the approaching vehicle (refer to FIG. 1B) including the "first information showing that the other vehicle is approaching" and the "second information showing an arrival direction of the approaching other vehicle." At this time, the CPU may make the speaker 42 pronounce a predetermined warning tone or a "message including the first information and second information". Thereafter, the CPU progresses to step 595, and once ends this routine.

On the other hand, at a time point of performing processing of the above-mentioned step 575, when the magnitude ΔXw of the fluctuation range is less than the upper limit value ΔXmax, the CPU judges as "Yes" at step 575, and increases the value of the confirmation number counter Cnt by only "1" at step 560. Subsequently, the CPU performs processing of step 565.

At this stage, the value of the confirmation number counter Cnt is "2", and is smaller than the upper limit number Cntmax (=10). Therefore, the CPU judges as "No" at step 565 and performs processes of step 570, and once ends this routine.

Such a processing is repeated whenever the constant time period ts has passed. Therefore, since a state that the magnitude ΔXw of the fluctuation range is less than the upper limit value ΔXmax continues when the "reflection object (wall of shielding) of the reflected wave of the radar sensor" located continuously at a constant distance beside the own vehicle exists, the value of the confirmation number counter Cnt increases gradually by processing of step 560 to reach the upper limit number Cntmax.

In this case, the CPU judges as "Yes" at step 565 and progresses to step 585, and displays on the display 41 a notification image of an approaching vehicle (for example, refer to FIG. 4B.) which includes the "first information showing that the other vehicle is approaching", but does not include the "second information showing an arrival direction of the approaching other vehicle." Namely, the CPU forbids the notification of the second information. Also at this time, the CPU may make the speaker 42 pronounce a predetermined warning tone or a "message including only the first information." Thereafter, the CPU progresses to step 595, and once ends this routine.

After performing processing of either one of step 580 and step 585, the CPU continues the display of the notification image of an approaching vehicle on the display 41, without performing the processing from step 535, until the own vehicle disappears from the notification area of an approaching vehicle, or until the notification condition of an approaching vehicle becomes not being satisfied.

As mentioned above, since it can be judged that the wall of shielding which reflects the reflected wave of the radar sensor exists when it can be considered that the reflection distance Xw as the reflection distance-correlation value has not fluctuated for a predetermined time period or longer, the first device 10 forbids the notification of the second information (information showing the arrival direction of the other vehicle) from the notification unit. As a result, a possibility of notifying a driver of an arrival direction of the other vehicle falsely recognized due to a ghost wave can be reduced.

In the above-mentioned step 520, the CPU acquires the radar sensor information (the relative distance Lr, the traversal distance |Xr|) from the millimeter-wave radar sensor 33. However, the radar sensor information may be any one of a pair of the direction (θ) of the detected other vehicle and the distance (Lr) from the own vehicle to the other vehicle, the coordinate (Xr, Yr) showing the location of the detected other vehicle, and a pair of the distance (Lr) from the own vehicle to the other vehicle and the X coordinate (Xr) of the Y coordinate (Yr) of the other vehicle.

Moreover, the above-mentioned routine is performed for each of respective combinations of the other vehicles whose relative positions with respect to the own vehicle are determined from the radar sensor information and the other vehicles whose relative positions with respect to the own vehicle are determined by the relative-position acquisition part 24.

Furthermore, although a time period (ts×Cntmax) until the confirmation number counter Cnt reaches the upper limit number Cntmax is adopted as the predetermined time period in this example, time length of such a routine, rather than such a number of executions of the routine, may be adopted as the predetermined time period. In addition, in this example, whether the reflection distance Xw is approximately constant is judged by whether the fluctuation range ΔXw computed as the difference between the reflection distance Xw computed this time and the reflection distance Xwold computed last time is less than the upper limit value ΔXmax, whenever the reflection distance Xw is computed. However, a plurality of reflection distances Xw computed whenever the constant time period is has passed in a time period required for the confirmation number counter Cnt to reach the upper limit number Cntmax, or in a time period as a predetermined time length may be memorized and a value corresponding to a difference between the largest value and the smallest value of those reflection distances Xw may be computed as the fluctuation range ΔXw.

Figure 6:
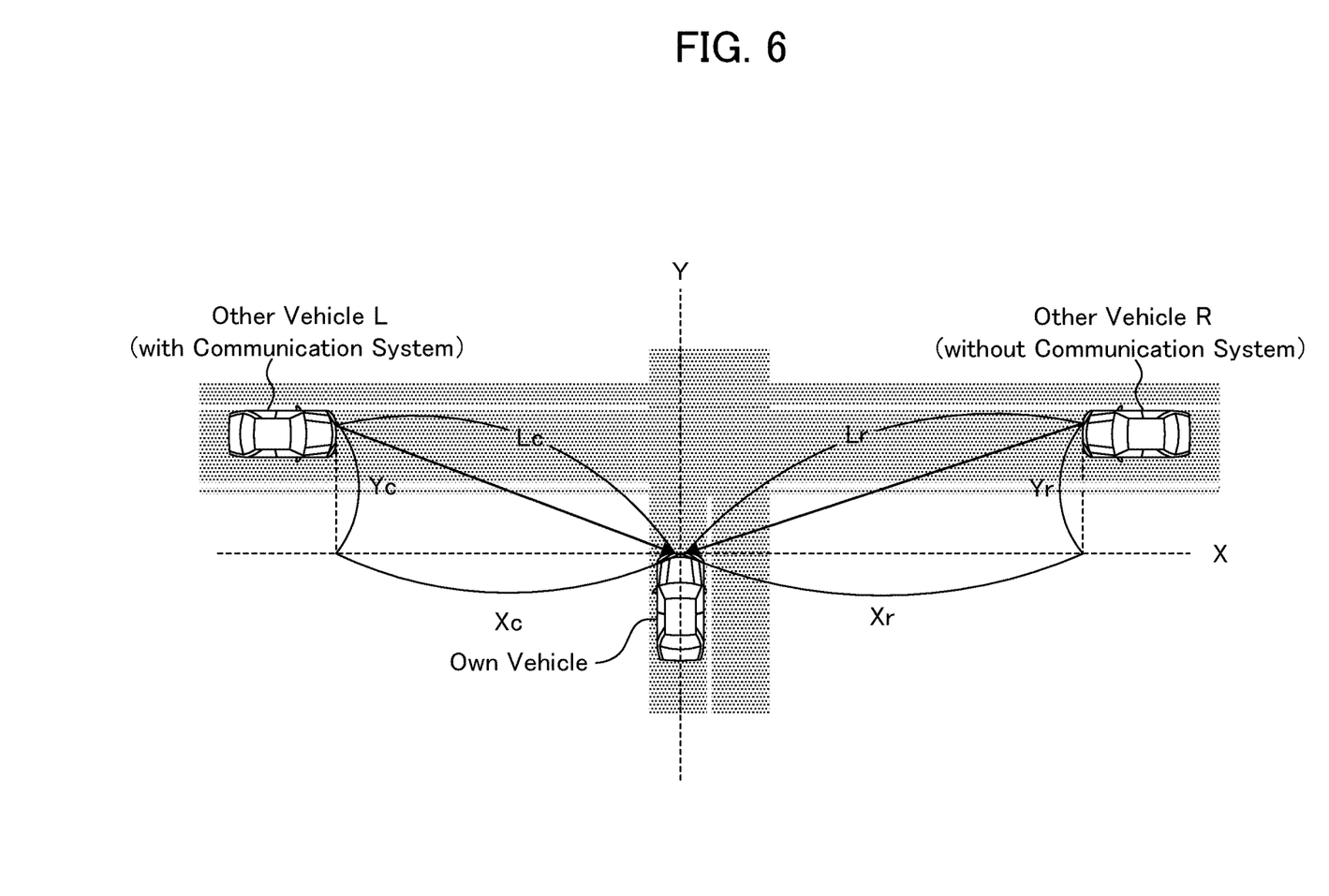
FIG. 6 is a schematic view for showing a situation where two other vehicles are accidentally located in symmetrical positions on the right and left sides on a crossroad.

By the way, as shown in FIG. 6, for example, a situation where two other vehicles are located incidentally in symmetrical positions on right and left sides on a crossroad of an intersection which is ahead of an own vehicle is assumed. Furthermore, it is assumed that the other vehicle R approaching from a right side carries neither a vehicle-to-vehicle communication system nor a road-to-vehicle communication system while the other vehicle L approaching from a left side carries a vehicle-to-vehicle communication system and/or a road-to-vehicle communication system. In this case, the relative position (Xr, Yr) of the other vehicle R with respective to the own vehicle, which is determined from the radar sensor information, and the converted relative position (Xc, Yc) which is a location of the relative-position of the other vehicle L with respective to the own vehicle in the above-mentioned X-Y coordinate space, which is acquired by the relative-position acquisition part 24, are in symmetrical positions on right and left sides of the Y-axis.

In the above-mentioned case, it is difficult to distinguish whether a millimeter wave received by the millimeter-wave radar sensor 33 is a millimeter wave reflected by the other vehicle R or a millimeter wave (namely, ghost wave) which is obtained by a millimeter wave reflected by the other vehicle L being re-reflected by shielding (which does not exist actually). As a result, there is a possibility that the other vehicle R may be falsely recognized as a ghost vehicle (of the other vehicle L) and the notification of the second information showing that the other vehicle R is approaching from a right side may be forbidden even though the other vehicle R is approaching from a right side actually.

However, in accordance with the first device 10, the notification of the second information from the notification unit 40 is forbidden only when the fluctuation range ΔXw of the reflection distance Xw continues to be less than the predetermined upper limit value ΔXmax for a predetermined time period. Namely, only when all of the fluctuation ranges ΔXw's of a plurality of reflection distances Xw's computed multiple times are less than the predetermined upper limit value ΔXmax, the notification of the second information from the notification unit 40 is forbidden. On the other hand, even when a situation as shown in FIG. 6 arises incidentally, a probability that the other vehicle L and the other vehicle R may continue to move symmetrically for a predetermined period is very small.

Then, since the fluctuation range ΔXw of the (apparent) reflection distance Xw becomes the predetermined upper limit value ΔXmax or more when running states of the other vehicle L and the other vehicle R become non-symmetrical, the first device 10 very rarely forbids the notification of the second information from the notification unit 40. In addition, even when a predetermined time period has pass while the running states of the other vehicle L and the other vehicle R remains symmetrical by a series of any chances (namely, the fluctuation range ΔXw of the apparent reflection distance Xw continues being less than the predetermined upper limit value ΔXmax), it leads only to forbidding the notification of the second information from the notification unit 40, for example, as shown in FIG. 4B, and the first information showing that a certain other vehicle is approaching is notified.

Second Embodiment

When the wall of shielding which reflects the reflected wave of the millimeter-wave radar sensor 33 does not exist beside the own vehicle along the running direction of the own vehicle, the relative position (Xr, Yr) of the other vehicle with respective to the own vehicle, which is determined from the radar sensor information, and the converted relative position (Xc, Yc) of the other vehicle, which is acquired by the relative-position acquisition part 24, must coincide with each other.

Figure 7:
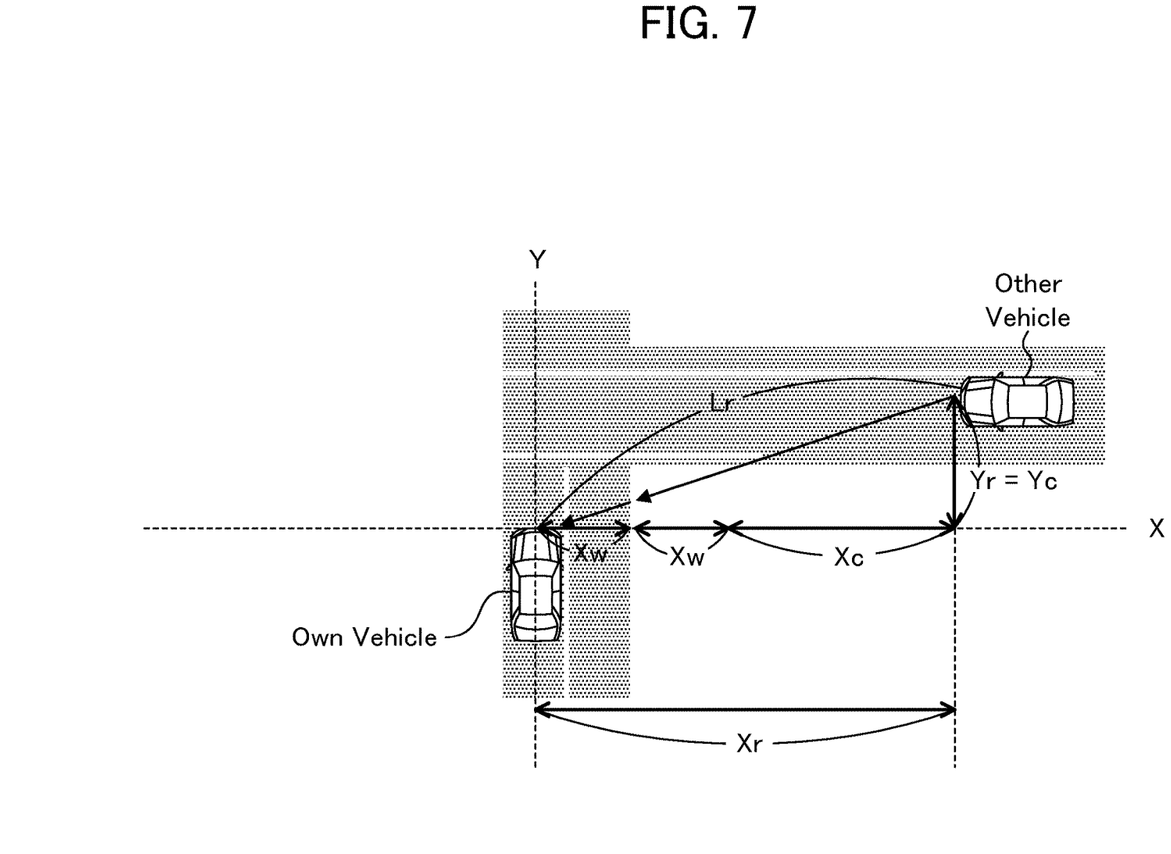
FIG. 7 is a schematic view for showing a situation where the other vehicle is approaching from the right side of an own vehicle at an intersection located ahead of the own vehicle, wherein shielding which reflects a reflected wave of a radar sensor does not exist on the right side of the own vehicle, the other vehicle is running a crossroad of the intersection.

However, actually, a difference may arise between the relative position (Xr, Yr) and the converted relative position (Xc, Yc) due to a detection error and/or a calculation error, etc., for example. In such a case, as shown in FIG. 7, for example, the reflection distance Xw is computed by the first device 10. Moreover, the reflection distance Xw thus computed arises from an error etc., and is computed as a very small value. Therefore, the fluctuation range ΔXw of the reflection distance Xw within a predetermined time period is also small, and there is a high possibility that it may become less than the predetermined upper limit value (ΔXmax). As a result, although the notice of the other vehicle approaching from the right side of the own vehicle (namely, both the first information and the second information) should be normally given to a driver, the notification of the second information (namely, information which determines the arrival direction of the other vehicle) from the notification unit 40 is forbidden.

However, the above-mentioned other vehicle is an existent vehicle (vehicle which exists actually) rather than a ghost vehicle, and the notification restriction part 27 should normally make the notification unit 40 give notice of not only the first information, but also the second information from (the notification of the second information from the notification unit 40 should not be forbidden).

The notification device of an approaching vehicle according to the second embodiment of the present invention which will be explained below (which may be referred to as a "second device" hereinafter) copes with the above-mentioned subject.

(Configuration)

A configuration of the second device is the same as the configuration of the first device 10 explained while referring to FIG. 2. Therefore, explanation about the configuration of the second device, which is common with the first device 10, is omitted, and only the configuration of the second device, which is different from that of the first device 10, will be explained. In the following explanation, the same reference signs as those given to the respective constituent elements in FIG. 2 are used for constituent elements of the second device, which are common with those of the first device 10. Difference in the configuration of the second device from that of the first device 10 is in a point that the notification restriction part 27 is configured as follows.

When both the first component (Xr) and the second component (Xc) are positive values or when both the first component (Xr) and the second component (Xc) are negative values, the notification restriction part 27 does not forbid the notification of the second information from the notification unit 40 even when it can be considered that the reflection distance-correlation value (reflection distance Xw) has not fluctuated for a predetermined time period or longer. Namely, in the second device, when both the relative position (Xr, Yr) of the other vehicle, which is determined from the radar sensor information, and the converted relative position (Xc, Yc) of the other vehicle, which is acquired by the relative-position acquisition part 24 are on the same side (left side or right side) of the own vehicle, notice of both the existence and arrival direction of the other vehicle approaching the own vehicle are given to the driver.

In accordance with this notification restriction part 27, a situation where the above-mentioned reflection distance is detected due to a detection error and the notification of the second information which should be notified normally is forbidden even though shielding (reflection object), such as a roadside wall, does not exist beside the own vehicle and both the millimeter-wave radar sensor 33 and the relative-position acquisition part 24 detect an identical other vehicle can be avoided. As a result, drop in frequency of notification of a correct arrival direction of the other vehicle is decreased.

(Specific Operation)

Next, an operation of the second device will be explained in detail below. The operation of the second device is fundamentally the same as the operation of the above-mentioned first device 10, which was explained while referring to FIG. 3 to FIG. 5. However, due to the above-mentioned difference in the notification restriction part 27, step 800 is added between step 545 and step 550 in a routine performed in the second device, as shown in a flowchart of FIG. 8. Therefore, in the following explanation, this step 800 will be focused and explained in detail.

Figure 8:
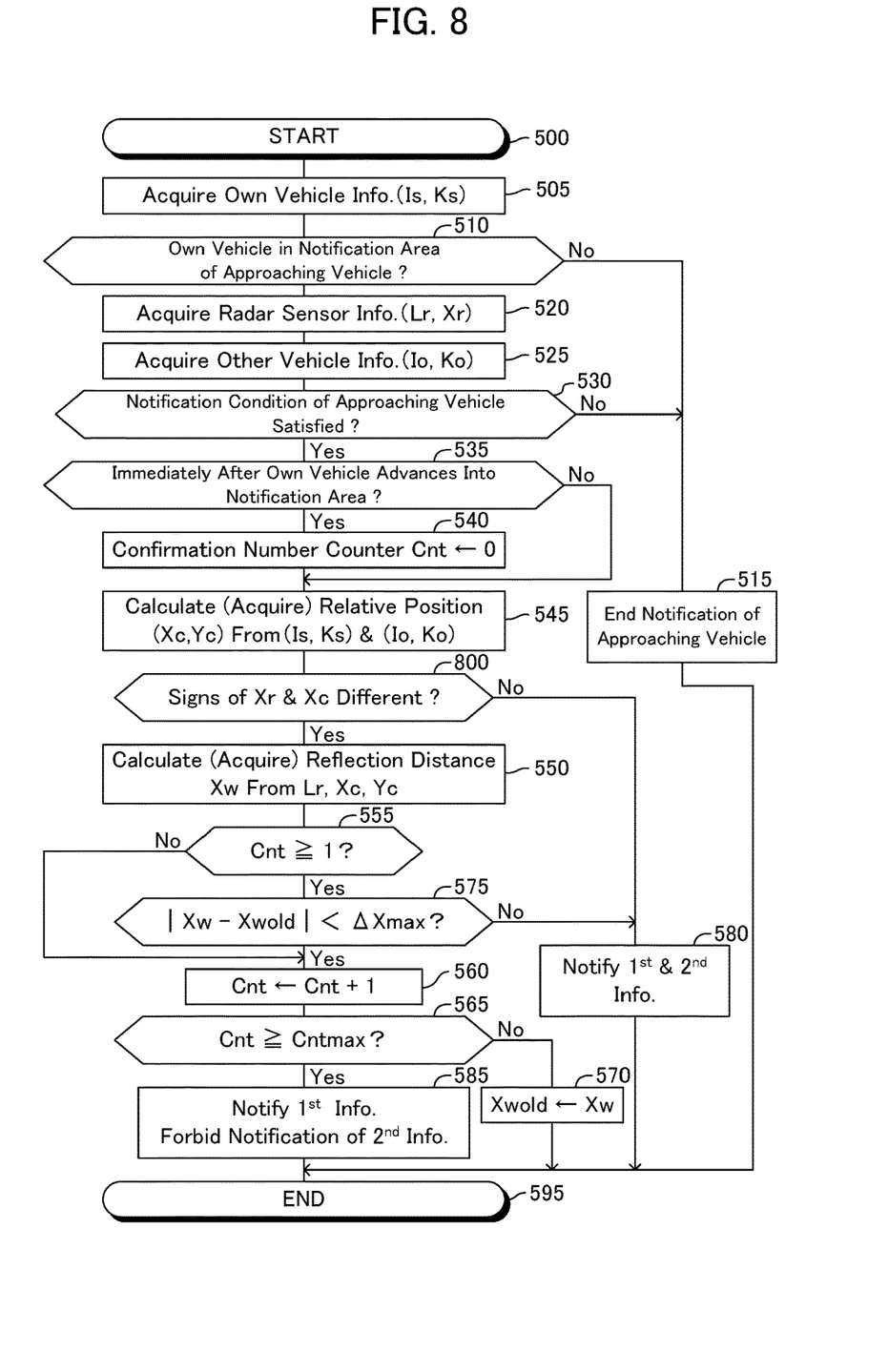
FIG. 8 is a flowchart for showing a specific operation of a notification device of an approaching vehicle according to a second embodiment of the present invention (second device).

Like the first device 10, also in the second device, the CPU included in the alert ECU 20 which constitutes the control unit starts processing from step 500 of FIG. 8 when it becomes a predetermined timing, and progresses to step 505 to step 545. Since detail of the processing performed in these steps has been already mentioned in the explanation about the first device 10, the explanation thereof is omitted here.

Then, the CPU progresses to the following step 800, and judges whether the signs of positive and negative of the first component (Xr) acquired in step 520 and the second component (Xc) acquired in step 545 differ. In other words, the CPU judges whether the relative position (Xr, Yr) of the other vehicle, which is determined from the radar sensor information, and the converted relative position (Xc, Yc) of a vehicle, which is acquired by the relative-position acquisition part 24 are on opposite sides in right and left direction (across the Y-axis) when seeing them from the own vehicle.

As shown in FIG. 3, for example, when a wall of shielding exists beside the own vehicle along the running direction of the own vehicle and the radar sensor information is information of a ghost vehicle due to the millimeter wave (ghost wave) reflected by this wall, the sign of the first component (Xr) and the sign of the second component (Xc) are different from each other. In this case, the CPU judges as "Yes" in step 800, and performs the processing from the following step 550 in order like the first device 10.

On the other hand, as shown in FIG. 7, for example, when a wall of shielding does not exist beside the own vehicle along the running direction of the own vehicle and the radar sensor information is information of an existent vehicle, the signs of the first component (Xr) and the second component (Xc) coincide (both are positive or both are negative). Therefore, the CPU judges as "No" in step 800, and progresses to the following step 580, and displays on the display 41 the notification image of an approaching vehicle including the "first information showing that the other vehicle is approaching" and the "second information showing the arrival direction of the approaching other vehicle" (for example, refer to FIG. 1B).

As mentioned above, in accordance with the second device, a "situation where the notification of the second information whose notice should be normally given is forbidden" since a reflection distance-correlation value (reflection distance Xw) with a small fluctuation range (ΔXw) is computed due to a detection error and/or a calculation error, etc., for example, even though a wall of shielding does not exist beside the own vehicle along the running direction of the own vehicle and the radar sensor information is information of an existent vehicle, can be avoided. As a result, drop in frequency of notification of a correct arrival direction of the other vehicle is decreased.

Although some embodiments and modifications having a specific configuration have been explained sometimes referring to accompanying drawings as mentioned above for the purpose of explaining the present invention, it should not be interpreted as the scope of the present invention being limited to these exemplary embodiments and modifications, and it is needless to say that corrections can be properly added within the limits of the matters described in the claims and the specification.

REFERENCE SIGNS LIST

10: Notification device of an approaching vehicle (First device), 20: Alert ECU, 21: Other vehicle information-acquisition part, 22: Own vehicle information-acquisition part, 23: Radar sensor information-acquisition part, 24: Relative-position acquisition part, 25: Reflection distance acquisition part, 26: Notification control part, 27: Notification restriction part, 31: Radio for communication, 32: GPS receiver, 33: Millimeter-wave radar sensor, 34: Navigation device, 34: Other vehicle sensors, 40: Notification unit, 41: Display and 42: Speaker.

The invention claimed is:

1. A notification device of an approaching vehicle, comprising:
a radar sensor configured to transmit a radio wave and received a reflected wave of said transmitted radio wave,
and to acquire, as radar sensor information,
information required for determining a location of the other vehicle with respect to an own vehicle based on said transmitted radio wave and said reflected wave which was received,
a notification unit configured to notify a driver of said own vehicle of information for drive assist,
and a control unit configured to make said notification unit give notice of first information showing that the other vehicle is approaching and second information showing an arrival direction of said approaching other vehicle,
when it is judged that there is the other vehicle approaching said own vehicle while running a crossroad which intersects an anterior run way of said own vehicle,
based on a time shift of said radar sensor information; wherein said control unit comprises:
an other vehicle information-acquisition part configured to acquire other vehicle information for determining a location of said other vehicle using at least one of vehicle-to-vehicle communication and road-to-vehicle communication,
an own vehicle information-acquisition part configured to acquire own vehicle information for determining a location of said own vehicle based on a signal given from the outside of said own vehicle,
a relative position-acquisition part configured to acquire a relative position of said other vehicle with respect to said own vehicle by calculation based on said other vehicle information and said own vehicle information,
a reflection distance-acquisition part configured to compute a value according to a difference between an absolute value of a first component and an absolute value of a second component,
as a reflection distance-correlation value, based on said radar sensor information and said relative position acquired by said relative-position acquisition part,
said first component is an X-axis component of a relative position of said other vehicle with respect to said own vehicle,
which is determined based on said radar sensor information,
in an X-V coordinate space with its origin set at a location of said own vehicle,
a Y-axis set in a traveling direction of said own vehicle and an X-axis set in a direction perpendicular to the Y-axis,
and said second component is an X-axis component of a converted relative position that is a location of said relative position acquired by said relative-position acquisition part in said coordinate space,
and a notification restriction part configured to forbid said notification unit to give notice of said second information when it can be considered that said reflection distance-correlation value has not fluctuated for a predetermined time period or longer.

2. The notification device of an approaching vehicle according to claim 1,
wherein:
said notification restriction part is configured to consider that said reflection distance-correlation value has not fluctuated for said predetermined time period or longer when a specific condition in which a state that an absolute value of a difference between said reflection distance-correlation value at present and said reflection distance-correlation value said predetermined time period ago is less than a predetermined threshold value has continued for said predetermined time period or longer is satisfied.

3. The notification device of an approaching vehicle according to claim 1, wherein:

said notification restriction part is configured not to forbid said notification unit to give notice of said second information even when it can be considered that said reflection distance-correlation value has not fluctuated for said predetermined time period or longer, in a case where both said first component and said second component are positive values or a case where both said first component and said second component are negative values.

4. The notification device of an approaching vehicle according to claim 2, wherein:

said notification restriction part is configured not to forbid said notification unit to give notice of said second information even when it can be considered that said reflection distance-correlation value has not fluctuated for said predetermined time period or longer, in a case where both said first component and said second component are positive values or a case where both said first component and said second component are negative values.

5. The notification device of an approaching vehicle according to claim 1, wherein:

said reflection distance acquisition part is configured to compute a value of a half of the difference between the absolute value of said first component and the absolute value of said second component as a reflection distance as said reflection distance correlation value.

6. The notification device of an approaching vehicle according to claim 5, wherein:

said reflection distance acquisition part is configured to compute said reflection distance $Xw$ based on the following formula in a case where a relative distance $Lr$ from said own vehicle to said other vehicle is included in said radar sensor information and said converted relative position is expressed as $(Xc, Yc)$, $$Xw = \frac{\sqrt{Lr^2 - Yc^2} - |Xc|}{2}.$$

* * * * *